(12) United States Patent
Zhang et al.

(10) Patent No.: US 9,379,811 B2
(45) Date of Patent: Jun. 28, 2016

(54) METHOD AND DEVICE FOR OPTIMIZING PERFORMANCE OF AN OPTICAL MODULE

(71) Applicant: Huawei Technologies Co., Ltd., Shenzhen, Guangdong (CN)

(72) Inventors: Changjun Zhang, Wuhan (CN); Bo Wang, Wuhan (CN); Jianmin Tang, Wuhan (CN); Leiying Pan, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 13/864,803

(22) Filed: Apr. 17, 2013

(65) Prior Publication Data

US 2013/0294767 A1    Nov. 7, 2013

(30) Foreign Application Priority Data

Apr. 17, 2012    (CN) .......................... 2012 1 0112253

(51) Int. Cl.
*H04B 10/69*    (2013.01)
*H04B 10/07*    (2013.01)

(52) U.S. Cl.
CPC .............. *H04B 10/07* (2013.01); *H04B 10/695* (2013.01); *H04B 10/697* (2013.01)

(58) Field of Classification Search
CPC .................................................... H04B 10/695
See application file for complete search history.

(56) References Cited

U.S. PATENT DOCUMENTS

| 6,504,868 B1 | 1/2003 | Koizumi |
| 6,577,696 B1 | 6/2003 | Burgmeier et al. |
| 6,580,763 B1 | 6/2003 | Muellner et al. |
| 6,970,417 B1* | 11/2005 | Doverspike et al. .......... 370/216 |
| 7,184,475 B2 | 2/2007 | Dohmen et al. |
| 2002/0089737 A1* | 7/2002 | Sugata ................... H03L 7/099 359/326 |
| 2002/0181573 A1 | 12/2002 | Dohmen et al. |
| 2004/0071219 A1 | 4/2004 | Vorenkamp et al. |

(Continued)

FOREIGN PATENT DOCUMENTS

| CN | 1423439 A | 6/2003 |
| CN | 1123180 C | 10/2003 |

(Continued)

OTHER PUBLICATIONS

Sen, Li, "Adaptive Minimum-BER Equalization in Alpha Stable Noise," Jan. 2008, Information Engineering College, Dailian Maritime University, Dalian, Liaoning, China.

*Primary Examiner* — Nathan Curs
(74) *Attorney, Agent, or Firm* — Leydig, Voit & Mayer, Ltd.

(57) ABSTRACT

Embodiments of the present invention provide a method and device for optimizing performance of an optical module. The optical module includes: an optical receiver, configured to receive an optical signal from an optical network, convert the optical signal into a first electrical signal, and process the first electrical signal according to a set control parameter for performance optimization, so as to obtain a second electrical signal; a connector, configured to send the second electrical signal obtained by the optical receiver to a host connected to the optical module, so that the host obtains bit error information according to the second electrical signal, and configured to receive the bit error information delivered by the host; and a processor, configured to adjust, according to the bit error information of the connector, the control parameter for performance optimization of the optical receiver.

17 Claims, 4 Drawing Sheets

(56) References Cited

U.S. PATENT DOCUMENTS

| | | | |
|---|---|---|---|
| 2004/0105687 A1* | 6/2004 | Myong et al. | 398/202 |
| 2005/0169638 A1* | 8/2005 | Tayebati et al. | 398/159 |
| 2005/0213986 A1 | 9/2005 | Yoshimoto et al. | |
| 2006/0136798 A1* | 6/2006 | Domagala | H04B 10/695 714/752 |
| 2008/0107165 A1 | 5/2008 | Nicolescu et al. | |
| 2009/0161780 A1 | 6/2009 | Schneider et al. | |
| 2010/0232804 A1 | 9/2010 | Djordjevic et al. | |

FOREIGN PATENT DOCUMENTS

| | | |
|---|---|---|
| CN | 1674475 A | 9/2005 |
| CN | 1227857 C | 11/2005 |
| CN | 1976248 A | 6/2007 |
| CN | 101179331 A | 5/2008 |
| CN | 101383659 A | 3/2009 |
| CN | 101465832 A | 6/2009 |
| CN | 101588207 A | 11/2009 |
| CN | 101977079 A | 2/2011 |
| CN | 102223175 A | 10/2011 |

* cited by examiner

METHOD AND DEVICE FOR OPTIMIZING PERFORMANCE OF AN OPTICAL MODULE

CROSS-REFERENCE TO RELATED APPLICATIONS

This application claims priority to Chinese Patent Application No. 201210112253.9, filed on Apr. 17, 2012, which is hereby incorporated by reference in its entirety.

FIELD OF THE INVENTION

The present invention relates to the field of communications technologies, and in particular, to a method and a device for optimizing performance of an optical module.

BACKGROUND OF THE INVENTION

With the development of optical communications technologies, the structure and environment of an optical network become more and more complex. Therefore, higher requirements for performance on an optical module, for example, sensitivity and an optical signal-to-noise ratio (Optical Signal-to-Noise Ratio, OSNR) have been raised. A sending end and a receiving end in an optical module may generally use multiple technologies to optimize performance of the optical module.

In the prior art, a host (Host) connected to an optical module may optimize a bit error rate of the optical module according to 0/1 bit error information. Alternatively, an equalizer in the optical module may compensate for channel distortion in the optical module. However, performance of the optical module using this method is still poor.

SUMMARY OF THE INVENTION

Embodiments of the present invention provide a method and a device for optimizing performance of an optical module, so as to improve performance of the optical module.

In one aspect, an embodiment of the present invention provides an optical module, which includes:

an optical receiver, configured to receive an optical signal from an optical network, convert the optical signal into a first electrical signal, and process the first electrical signal according to a set control parameter for performance optimization, so as to obtain a second electrical signal;

a connector, configured to send the second electrical signal obtained by the optical receiver to a host connected to the optical module, so that the host obtains bit error information according to the second electrical signal, and is configured to receive the bit error information delivered by the host; and a processor, configured to adjust, according to the bit error information received by the connector, the control parameter for performance optimization of the optical receiver.

In another aspect, an embodiment of the present invention provides a host, which includes:

a connector, configured to receive a second electrical signal reported by an optical module connected to the host, where the electrical signal is obtained after the optical module performs optical-to-electrical conversion on an optical signal received from an optical network and processes the signal according to a set control parameter for performance optimization; and is further configured to deliver bit error information to the optical module; and a processor, configured to obtain the bit error information according to the second electrical signal received by the connector, so that the optical module adjusts, according to the bit error information, the control parameter for performance optimization.

In another aspect, an embodiment of the present invention further provides an optical network node, which includes an optical module and a host, where the optical module is configured to receive an optical signal from an optical network, convert the optical signal into a first electrical signal, and process the first electrical signal according to a set control parameter for performance optimization, so as to obtain a second electrical signal; send the second electrical signal to the host, and receive bit error information delivered by the host; and adjust, according to the bit error information, the control parameter for performance optimization; and the host is configured to receive the second electrical signal reported by the optical module, obtain the bit error information according to the second electrical signal, and deliver the bit error information to the optical module.

In still another aspect, an embodiment of the present invention further provides a method for optimizing performance of an optical module, which includes:

receiving an optical signal from an optical network, converting the optical signal into a first electrical signal, and processing the first electrical signal according to a set control parameter for performance optimization, so as to obtain a second electrical signal;

sending the second electrical signal to a host connected to the optical module, so that the host obtains bit error information according to the second electrical signal;

receiving the bit error information delivered by the host; and adjusting, according to the bit error information, the control parameter for performance optimization.

By using the method and device for optimizing performance of an optical module provided by the embodiments of the present invention, after receiving the optical signal from the optical network, the optical module performs the optical-to-electrical conversion on the signal and then processes the signal according to the control parameter for performance optimization, and reports the obtained electrical signal to the host (Host). The host obtains the bit error information according to the electrical signal reported by the optical module and delivers the bit error information to the optical module. The optical module adjusts, according to the bit error information, the control parameter for performance optimization, so as to optimize multiple control parameters for performance optimization in the optical module, and improve the performance of the optical module.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
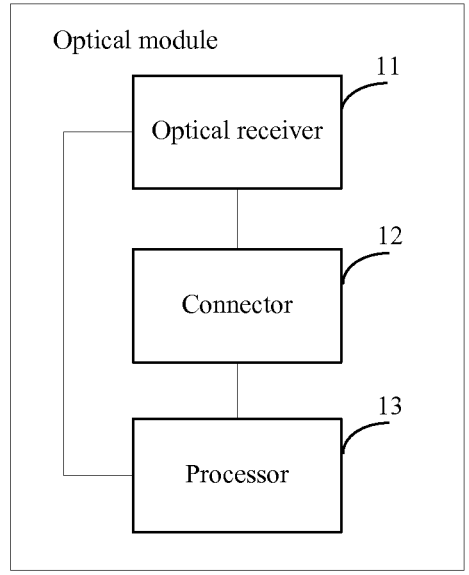
FIG. 1 is a schematic structural diagram of an embodiment of an optical module according to the present invention.

FIG. 1 is a schematic structural diagram of an embodiment of an optical module according to the present invention, and as shown in FIG. 1, the optical module may include: an optical receiver 11, a connector 12, and a processor 13.

The optical receiver 11 is configured to receive an optical signal from an optical network, convert the optical signal into a first electrical signal, and process the first electrical signal according to a set control parameter for performance optimization, so as to obtain a second electrical signal.

The connector 12 is configured to send the second electrical signal obtained by the optical receiver 11 to a host connected to the optical module, so that the host obtains bit error information according to the second electrical signal; and is configured to receive the bit error information delivered by the host.

The processor 13 is configured to adjust, according to the bit error information received by the connector 12, the control parameter for performance optimization of the optical receiver 11.

The optical receiver 11 in the optical module is an interface module between the optical module and the optical network, is capable of receiving the optical signal from the optical network, and converting the optical signal into the first electrical signal. Furthermore, the optical receiver 11 may further process the first electrical signal according to the set control parameter for performance optimization, so as to obtain the second electrical signal. Specifically, the set control parameter for performance optimization in the optical receiver 11 may include: a threshold parameter, an equalization parameter, and an electronic dispersion compensation (Electronic Dispersion Compensation, EDC) parameter.

The threshold parameter may be a control parameter for performing optimization on a ratio of 0 to 1 in the first electrical signal, for example, the threshold parameter may be set to 4:6, that is, when the ratio of 0 to 1 exceeds 4:6, the ratio of 0 to 1 of the first electrical signal needs to be adjusted. The equalization parameter may be a control parameter for performance optimization used to equalize frequency components in each frequency band of the first electrical signal, for example, a high frequency component and a low frequency component. The EDC parameter may be a control parameter for performance optimization used to perform electronic dispersion compensation on the first electrical signal.

The optical receiver 11 may process the first electrical signal according to the foregoing kinds of control parameters for performance optimization and other control parameters for performance optimization, so as to obtain the second electrical signal. It should be noted that, the optical receiver 11 may further perform regular processing on the first electrical signal, such as amplification and shaping.

The connector 12 is an interface module between the optical module and the host (Host). The processor 13 may be a component in the optical module, such as a micro control unit (Micro Control Unit, MCU) or a digital signal processor (Digital Signal Processor, DSP).

The connector 12 in the optical module may report the second electrical signal obtained by the optical receiver 11 to the host (Host), and after receiving the second electrical signal reported by the optical module, the host may perform calculation on the second electrical signal by using various existing algorithms, for example, a forward error correction (Forward Error Correction, FEC) algorithm, to obtain the bit error information. The bit error information may include one or any combination of the following information: 0/1 bit error information, corrected bit error information, loss of frame (Loss of Frame, LOF) state information, and loss of optical signal (Loss of Signal, LOS) state information. The processor 13 in the optical module may adjust, according to the bit error information, the set control parameter for performance optimization in the optical receiver 11. In different implementation scenarios, the bit error information delivered by the host may further include other information, which is not listed herein.

After calculating the bit error information, the host (Host) may deliver the bit error information to the optical module. After the connector 12 in the optical module receives the bit error information, the processor 13 may adjust, according to the bit error information received by the connector 12, the control parameter for performance optimization of the optical receiver 11. For example, the processor 13 may adjust a 0/1 bit error threshold parameter of the optical receiver 11 according to the 0/1 bit error information in the bit error information. The processor 13 may further adjust, according to the corrected bit error information in the bit error information, a threshold parameter for equalizing each frequency band of the optical receiver 11. The processor 13 may further adjust an EDC parameter of the optical receiver 11 according to the corrected bit error information in the bit error information, which is not described herein. A bit error rate (Bit Error Rate, BER) of the optical module can be lowered through the foregoing adjustment, so that performance of the optical module is optimized.

It should be noted that, when the host (Host) delivers the bit error information to the optical module, the bit error information may be delivered in multiple forms, such as the number of bit errors and a bit error rate. The host (Host) may package and deliver all information in the bit error information as a whole to the optical module, and may also deliver pieces of information in the bit error information to the optical module one by one in a certain sequence. In addition, the host (Host) may specifically deliver the bit error information to the connector 12 through a software interface or a hardware interface through which the host (Host) and the optical module are connected, or deliver the bit error information to the connector 12 through a combination of a software interface and a hardware interface.

After the connector 12 in the optical module receives the bit error information, the processor 13 may adjust the control parameter for performance optimization of the optical receiver 11 one by one in a certain sequence according to the pieces of information in the bit error information. For example, the processor 13 may first adjust the 0/1 bit error threshold parameter of the optical receiver 11 according to the 0/1 bit error information in the bit error information until the 0/1 bit errors are equalized; then the processor 13 may adjust, according to the corrected bit error information in the bit error information, the threshold parameter for equalizing each frequency band of the optical receiver 11; and at last, the processor 13 may further adjust the EDC parameter of the optical receiver 11 according to the bit error information. The processor 13 comprehensively adjusts, according to the bit error information, the control parameter for performance optimization of the optical receiver 11, so that the optical module is adaptive to a complex network environment and the performance of the module is optimized.

The processor 13 may adjust only one control parameter for performance optimization of the optical receiver 11 each time, and may adjust the same control parameter for performance optimization consecutively, so as to obtain an optimal value of the control parameter for performance optimization, and then start to adjust the next control parameter for performance optimization. All control parameters for performance optimization may be adjusted in a cycling manner. For the adjustment on each control parameter for performance optimization, the processor 13 may use a different algorithm according to a feature of the control parameter for performance optimization. For example, if an adjustment direction of a control parameter for performance optimization can be directly determined through a value of the control parameter for performance optimization and the bit error information, the processor 13 may use methods such as a proportion integration differentiation (Proportion Integration Differentiation, PID) control method and fixed/variable step size method to adjust the control parameter for performance optimization, and if a value of a control parameter for performance optimization and the bit error information have a non-monotonic relationship, the processor 13 may use a method such as a climbing method to adjust the control parameter for performance optimization along with the change of an environment.

It should be noted that, the optical module provided by the embodiment of the present invention only gives basic modules required for implementing the present invention, and other relevant circuits or relevant devices in the optical module are not listed.

Through the optical module provided by this embodiment, after receiving the optical signal from the optical network, the optical module performs the optical-to-electrical conversion on the signal and then processes the signal according to the control parameter for performance optimization, and reports the obtained electrical signal to the host (Host). The host obtains the bit error information according to the electrical signal reported by the optical module and delivers the bit error information to the optical module. The optical module adjusts, according to the bit error information, the control parameter for performance optimization, so as to optimize multiple control parameters for performance optimization in the optical module, and improve the performance of the optical module.

As a feasible implementation manner, when the connector 12 in the optical module receives the bit error information delivered by the host to the optical module, it may be determined, according to the LOF state information and/or the LOS state information, whether loss of frame and/or loss of optical signal occurs in the second electrical signal reported by the connector 12. It should be noted that, generally, the LOF state information and the LOS state information may be as follows: for example, the LOF state information may be marked by "1" if loss of frame occurs and marked by "0" if no loss of frame occurs; and similarly, the LOS state information may be marked by "1" if loss of optical signal occurs and marked by "0" if no loss of optical signal occurs. If the LOF state information and/or the LOS state information received by the connector 12 indicates that loss of frame occurs and/or loss of optical signal occurs, the processor 13 may set the control parameter for performance optimization of the optical receiver 11 to an initial value or stop adjusting the control parameter for performance optimization of the optical receiver 11.

If no loss of frame or loss of optical signal occurs, the processor 13 may further adjust, according to other information in the bit error information, the control parameter for performance optimization of the optical receiver 11. Specifically, the processor 13 may adjust the 0/1 bit error threshold parameter of the optical receiver 11 according to the 0/1 bit error information, and/or adjust the equalization parameter of the optical receiver 11 according to the corrected bit error information, and/or adjust the EDC parameter of the optical receiver 11 according to the corrected bit error information.

The threshold parameter may be a control parameter for performance optimization that the optical receiver 11 uses on a ratio of 0 to 1 in the first electrical signal, for example, the threshold parameter may be set to 4:6, that is, when the ratio of 0 to 1 exceeds 4:6, the ratio of 0 to 1 of the first electrical signal needs to be adjusted. The equalization parameter may be a control parameter for performance optimization that the optical receiver 11 uses to equalize frequency components in each frequency band of the first electrical signal, for example, a high frequency component and a low frequency component. The EDC parameter may be a control parameter for performance optimization that the optical receiver 11 uses to perform electronic dispersion compensation on the first electrical signal.

Figure 2:
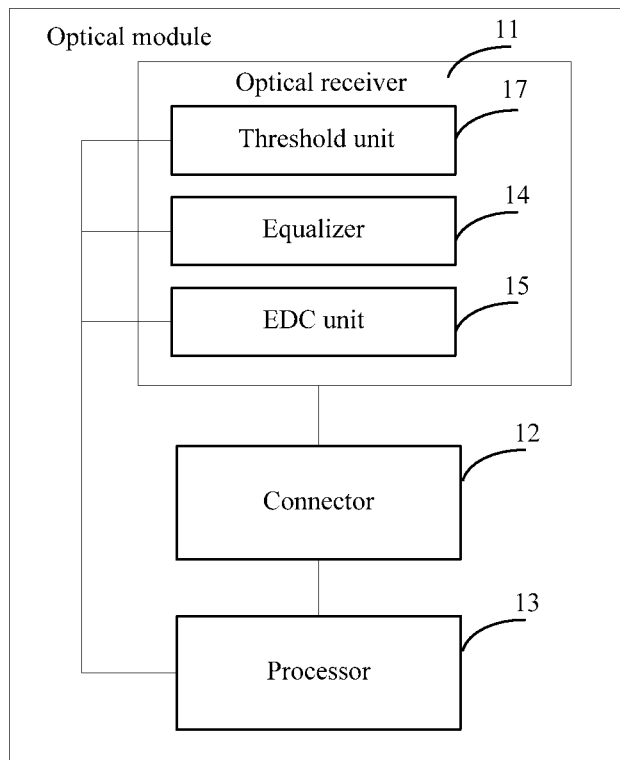
FIG. 2 is a schematic structural diagram of another embodiment of an optical module according to the present invention.

As a feasible implementation manner, as shown in FIG. 2, in an optical module provided by an embodiment of the present invention, the optical receiver 11 may specifically include: a threshold unit 17, an equalizer 14, and an EDC unit 15, where the threshold unit 17 may be configured to adjust a ratio of 0 to 1 in the optical signal according to a threshold parameter;

the equalizer 14 may be configured to perform equalization processing on each frequency band of the optical signal according to an equalization parameter; and the EDC unit 15 may be configured to adjust EDC of the optical signal according to an EDC parameter.

After receiving bit error information delivered by the host, a processor 13 may adjust a threshold parameter set in the threshold unit 17 according to 0/1 bit error information; adjust, according to corrected bit error information, an equalization parameter for equalizing each frequency band set in the equalizer 14; and further adjust an EDC parameter set in the EDC unit 15 according to the corrected bit error information.

To check various adjustment parameters delivered to the optical module, optionally, the bit error information delivered by the host to the optical module may further include: a bit error information checksum.

After a connector 12 receives the bit error information, the processor 13 may first determines, according to the bit error information checksum, whether the bit error information checksum is correct; if the bit error information checksum is correct, the processor 13 may adjust, according to the bit error information, the control parameter for performance optimization of the optical receiver 11, and if the bit error information checksum is incorrect, the processor 13 may stop adjusting the control parameter for performance optimization of the optical receiver 11. That is, if the bit error information checksum is incorrect, the processor 13 may stop the adjustment.

Figure 3:
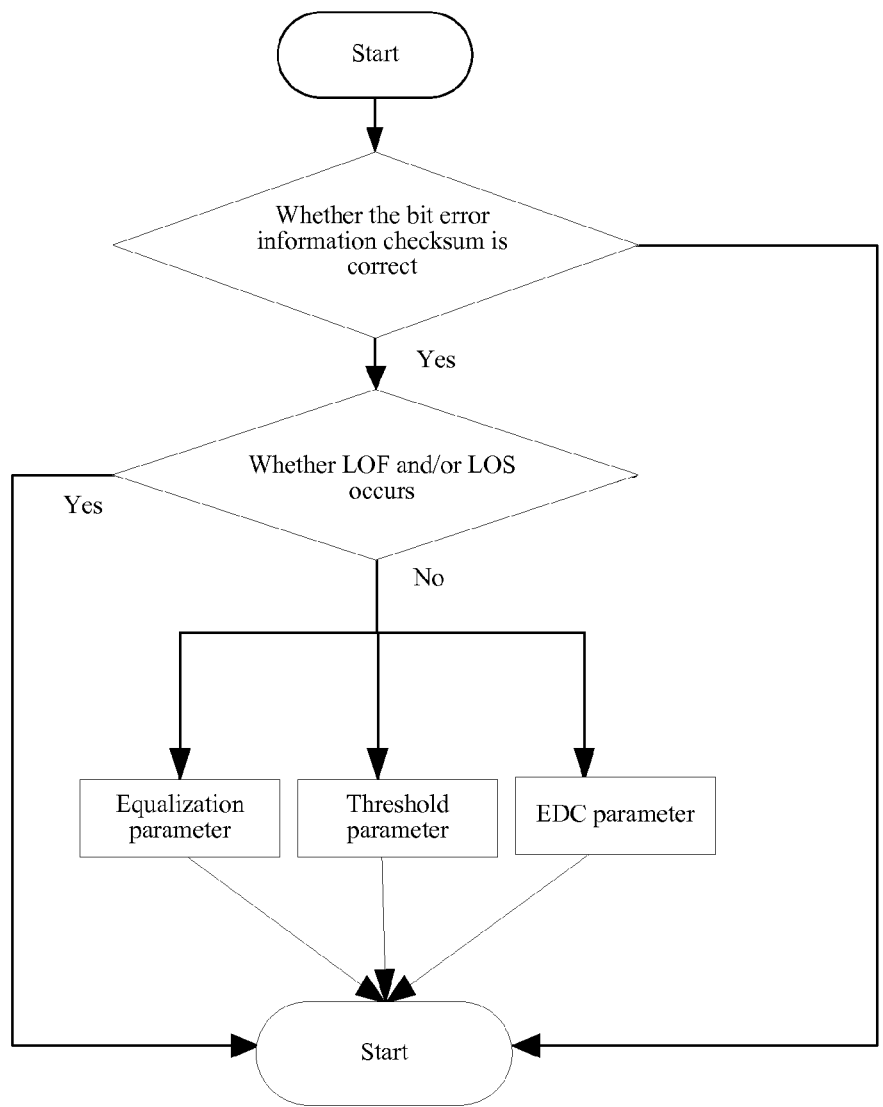
FIG. 3 is a schematic flow chart of an operation of an optical module according to an embodiment of the present invention.

To sum up, for the specific operation performed by the processor 13 after the connector 11 receives the bit error information delivered by the host, reference may be made to FIG. 3.

Apart from the foregoing various adjustment parameters and information such as the bit error information checksum, optionally, the host may further deliver information to the processor 13, such as a bit error information statistics period of the host and an algorithm type that the host uses to obtain the bit error information, so that the connector 11 receives the bit error information delivered by the host in the bit error information statistics period.

Figure 4:
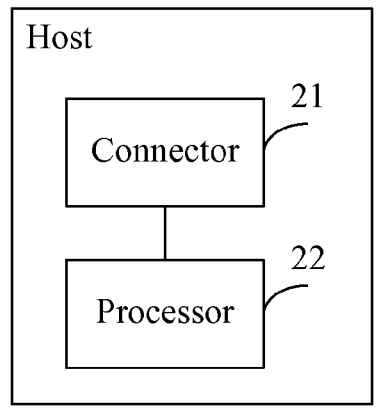
FIG. 4 is a schematic structural diagram of an embodiment of a host according to the present invention.

FIG. 4 is a schematic structural diagram of an embodiment of a host according to the present invention, and as shown in FIG. 4, the host includes: a connector 21 and a processor 22.

The connector 21 is configured to receive a second electrical signal reported by an optical module connected to the host, where the electrical signal is obtained after the optical module performs optical-to-electrical conversion on an optical signal received from an optical network and processes the signal according to a set control parameter for performance optimization; and is further configured to deliver bit error information to the optical module.

The processor 22 is configured to obtain the bit error information according to the second electrical signal received by the connector 21, so that the optical module adjusts, according to the bit error information, the control parameter for performance optimization.

After receiving the second electrical signal reported by the optical module, the connector 21 in the host may use various existing algorithms to perform calculation on the second electrical signal, for example, using an FEC algorithm to perform calculation on the second electrical signal reported by the optical module, so as to obtain one or any combination of the following adjustment parameters: 0/1 bit error information, corrected bit error information, loss of frame LOF state information, and loss of optical signal LOS.

The optical module may report the second electrical signal to the host in real time, and the host may set a certain statistics period. After the statistics period arrives, the processor 22 may obtain the bit error information according to the second electrical signal reported by the optical module and received by the connector 21 in the statistics period. The connector 21 may package the obtained bit error information and send the bit error information to the optical module, and may also deliver pieces of information included in the bit error information to the optical module one by one. For example, the loss of frame LOF state information and/or the loss of optical signal LOS state information may be delivered to the optical module first, then the 0/1 bit error information is delivered to the optical module, and finally the corrected bit error information is delivered to the optical module.

In order to make the optical module capable of checking the bit error information delivered by the connector 21 in the host, optionally, the connector 21 may further deliver a bit error information checksum to the optical module, where the bit error information checksum may be used to check whether the bit error information delivered by the connector 21 is correct. If the optical module determines that the bit error information checksum is correct, the optical module may adjust, according to the bit error information, the control parameter for performance optimization, and if the bit error information checksum is incorrect, the optical module may stop adjusting the control parameter for performance optimization in the optical module.

Apart from the foregoing adjustment parameters and information such as the bit error information checksum, optionally, the connector 21 in the host may further deliver information to the optical module, such as a bit error information statistics period of the host and an algorithm type that the host uses to obtain the bit error information.

Figure 5:
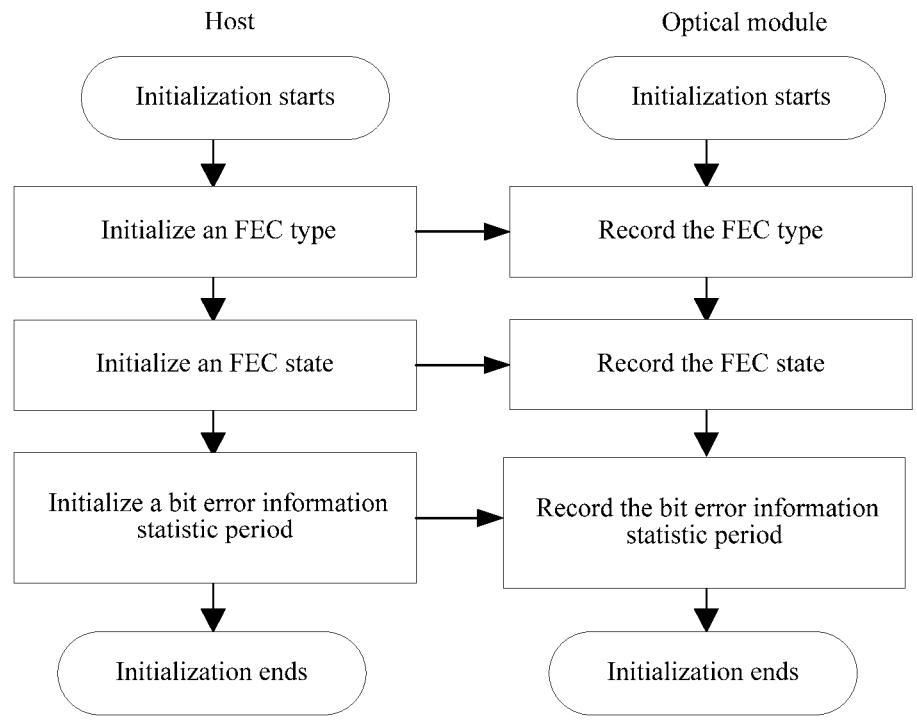
FIG. 5 is a schematic flow chart of initialization performed by a host according to the present invention.

Furthermore, the present invention provides an initialization process of the host, and as shown in FIG. 5, the initialization process of the host may be performed by the processor 22. The processor 22 may first initialize an FEC type, for example, normal FEC or enhanced FEC; the processor 22 may further initialize an FEC state in the host, that is, whether a function of FEC calculation in the host is enabled; and the processor 22 may further initialize a bit error information statistics period. The processor 22 may deliver a result of the initialization to the optical module after performing each initialization step, and the processor 13 in the optical module records the result. For example, after initializing the FEC type, the processor 22 may deliver the initialized FEC type to the optical module, and the processor 13 in the optical module may record the FEC type used by the host. After initializing the FEC state, the processor 22 may deliver the initialized FEC state to the optical module, and the processor 13 in the optical module may record whether the function of FEC calculation in the host is enabled. After initializing the bit error information statistics period, the processor 22 may also deliver the bit error information statistics period to the optical module, so that the processor 13 in the optical module records the initial bit error information statistics period of the host.

Figure 6:
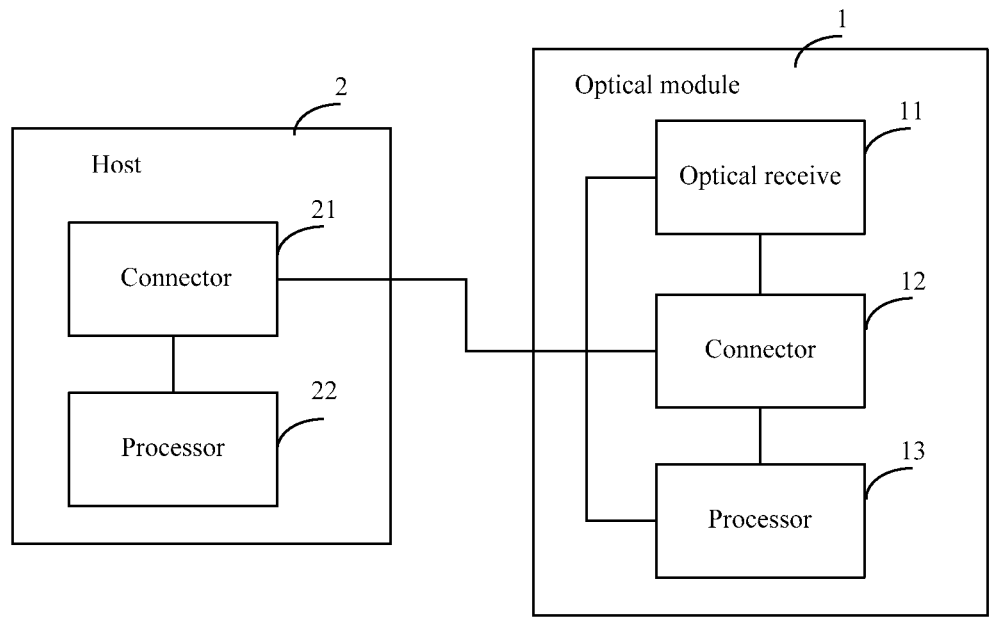
FIG. 6 is a schematic structural diagram of another embodiment of an optical network according to the present invention.

FIG. 6 is a schematic structural diagram of an embodiment of an optical network node according to the present invention, and as shown in FIG. 6, the optical network node may include: an optical module 1 and a host 2.

The optical module 1 is configured to receive an optical signal from an optical network, convert the optical signal into a first electrical signal, and process the first electrical signal according to a set control parameter for performance optimization, so as to obtain a second electrical signal; send the second electrical signal to the host 2, and receive bit error information delivered by the host 2; and adjust, according to the bit error information, the control parameter for performance optimization.

The host 2 is configured to receive the second electrical signal reported by the optical module 1, obtain the bit error information according to the second electrical signal, and deliver the bit error information to the optical module 1.

The optical network node provided by the embodiment of the present invention may specifically be a receiving end of the optical network node, and for the specific structure and function of the included optical module 1 and host 2, reference may be made to the optical module embodiment and the host embodiment provided by the embodiments of the present invention, which are not elaborated herein again.

Through the optical network node provided by the embodiment, after receiving the optical signal from the optical network, the optical module performs the optical-to-electrical conversion on the signal and then processes the signal according to the control parameter for performance optimization, and reports the obtained electrical signal to the host (Host). The host obtains the bit error information according to the electrical signal reported by the optical module and delivers the bit error information to the optical module. The optical module adjusts, according to the bit error information, the control parameter for performance optimization, so as to optimize multiple control parameters for performance optimization in the optical module, and improve performance of the optical module.

Figure 7:
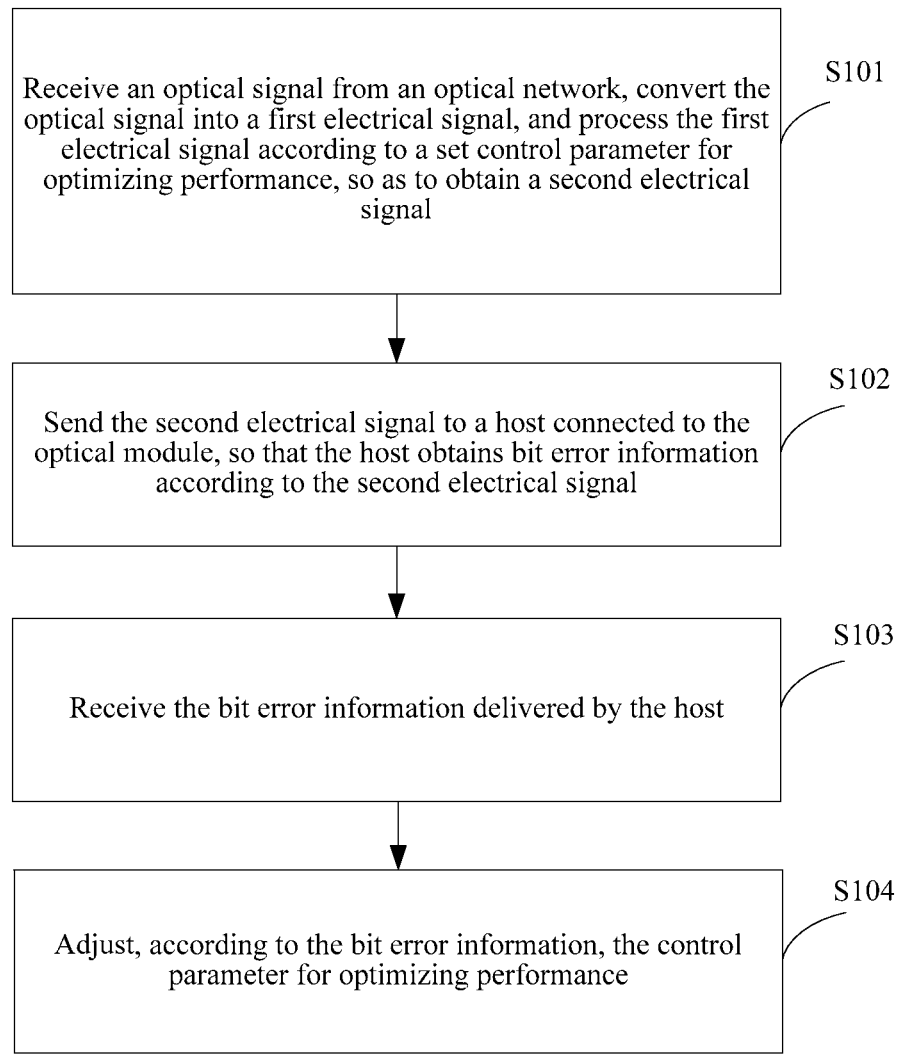
FIG. 7 is a flow chart of an embodiment of a method for optimizing performance of an optical module according to the present invention.

FIG. 7 is a flow chart of an embodiment of a method for optimizing performance of an optical module according to the present invention, and as shown in FIG. 7, the method for optimizing performance of an optical module may include the following steps:

S101: Receive an optical signal from an optical network, convert the optical signal into a first electrical signal, and process the first electrical signal according to a set control parameter for performance optimization, so as to obtain a second electrical signal.

S102: Send the second electrical signal to a host connected to the optical module, so that the host obtains bit error information according to the second electrical signal.

S103: Receive the bit error information delivered by the host.

S104: Adjust, according to the bit error information, the control parameter for performance optimization.

A subject that performs the foregoing steps is an optical module in an optical network node, and the optical network node may specifically be a receiving end of the optical network node.

In S102, the received bit error information includes one or any combination of the following information: 0/1 bit error information, corrected bit error information, electronic dispersion compensation EDC information, loss of frame LOF state information, and loss of optical signal LOS state information.

As a feasible implementation manner, if the received LOF state information indicates that loss of frame occurs, and/or the LOS state information indicates that loss of optical signal occurs, the control parameter for performance optimization may be set to an initial value, or the adjustment on the control parameter for performance optimization is stopped.

The adjusting, according to the bit error information, the control parameter for performance optimization in the optical module may specifically include: adjusting a threshold parameter according to the 0/1 bit error information; and/or, adjusting an equalization parameter according to the corrected bit error information; and/or, adjusting an electronic dispersion compensation EDC parameter according to the corrected bit error information.

Optionally, the received bit error information may further include one or any combination of the following information: a bit error information statistics period of the host, an algorithm type that the host uses to obtain the bit error information, and a bit error information checksum.

As another feasible implementation manner, if the received bit error information includes the bit error information checksum, it may be first determined whether the bit error information checksum is correct; if the bit error information checksum is correct, the control parameter for performance optimization is adjusted according to the bit error information; otherwise, adjustment on the control parameter for performance optimization is stopped.

The method for optimizing performance of an optical module provided by the embodiment of the present invention corresponds to the optical module provided by the embodiment of the present invention. For the specific structure of the optical module and the method for implementing performance optimization of an optical module, reference may be made to the optical module embodiment provide by the present invention, which are not elaborated herein again.

By using the method for optimizing performance of an optical module provided by the embodiment, after receiving the optical signal from the optical network, the optical module performs the optical-to-electrical conversion on the signal and then processes the signal according to the control parameter for performance optimization, and reports the obtained electrical signal to the host (Host). The host obtains the bit error information according to the electrical signal reported by the optical module and delivers the bit error information to the optical module. The optical module adjusts, according to the bit error information, the control parameter for performance optimization, so as to optimize multiple control parameters for performance optimization in the optical module, and improve performance of the optical module.

Persons of skilled in the art should understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Read-Only Memory, RAM).

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent substitutions to some technical features thereof; without departing from the spirit and scope of the technical solution of the embodiments of the present invention.

What is claimed is:

1. An optical module, in an optical network node including a host, which is configured to interoperate with the host connected to the optical module to optimize performance of the optical module, the optical module comprising:
   an optical receiver, configured to:
      receive an optical signal from an optical network,
      convert the optical signal into a first electrical signal, and
      process the first electrical signal, according to a set control parameter in the optical receiver for performance optimization of the optical receiver, so as to obtain a second electrical signal;
   a connector, configured to:
      send the second electrical signal obtained by the optical receiver to the host connected to the optical module, so that the host obtains a bit error information according to the second electrical signal, and
      receive the bit error information obtained by the host; and
   a digital processor, configured to:
      adjust, according to the bit error information obtained by the host and received by the connector, the set control parameter in the optical receiver for performance optimization of the optical receiver.

2. The optical module according to claim 1, wherein the bit error information received by the connector comprises one or any combination of the following information: corrected bit error information, loss of frame (LOF) state information, and loss of optical signal (LOS) state information.

3. The optical module according to claim 2, wherein if the loss of frame LOF state information received by the connector indicates at least one of the group consisting of (a) loss of frame occurs and (b) the loss of optical signal LOS state information indicates that loss of optical signal occurs, the digital processor is configured to implement one of the following steps:
  (i) setting the control parameter for performance of the optimization of the optical receiver to an initial value, and
  (ii) skipping adjusting the control parameter for performance of the optimization of the optical receiver.

4. The optical module according to claim 2, wherein the digital processor is configured to implement at least one of the group consisting of:
  (a) adjusting an equalization parameter of the optical receiver according to the corrected bit error information; and
  (b) adjusting an electronic dispersion compensation (EDC) parameter of the optical receiver according to the corrected bit error information.

5. The optical module according to claim 1, wherein the bit error information received by the connector further comprises one or any combination of the following information: an algorithm type that the host uses to obtain the bit error information, and a bit error information checksum.

6. The optical module according to claim 5, wherein
  if the bit error information received by the connector comprises the bit error information checksum, the digital processor is further configured to determine whether the bit error information checksum is correct,
  if the bit error information checksum is correct, the digital processor is configured to adjust, according to the bit error information, the control parameter for performance of the optimization of the optical receiver; and
  if the bit error information checksum is incorrect, the digital processor is configured to skip the control parameter for performance of the optimization of the optical receiver.

7. The optical module according to claim 1, wherein the optical receiver comprises:
  a threshold unit, configured to adjust a ratio of 0 to 1 in the first electrical signal according to a threshold parameter;
  an equalizer, configured to perform equalization processing on a frequency band of the first electrical signal according to an equalization parameter; and
  an electronic dispersion compensation (EDC) unit, configured to adjust EDC of the first electrical signal according to an EDC parameter.

8. A host, in an optical network node including an optical module including an optical receiver and a digital processor, that is configured to interoperate with the optical module connected to the host to optimize performance of the optical module, the host comprising:
  a connector, configured to receive a second electrical signal obtained by the optical receiver and reported by the optical module connected to the host, wherein the second electrical signal is obtained after the optical receiver:
    performs optical-to-electrical conversion on an optical signal received from an optical network to render a first electrical signal, and
    processes the first electrical signal according to a set control parameter in the optical receiver for performance optimization of the optical receiver to render the second electrical signal; and
  a host processor, configured to obtain a bit error information according to the second electrical signal received by the connector,
  wherein the connector is further configured to deliver the bit error information to the optical module so that the digital processor of the optical module adjusts, according to the bit error information, the set control parameter in the optical receiver for performance optimization of the optical receiver.

9. The host according to claim 8, wherein the host processor is configured to perform a calculation on the electrical signal by using a forward error correction (FEC) algorithm to obtain the bit error information.

10. The host according to claim 8, wherein the bit error information obtained by the host processor comprises one or any combination of the following information: corrected bit error information, loss of frame LOF state information, and loss of optical signal LOS state information.

11. The host according to claim 8, wherein the bit error information obtained by the host processor further comprises one or any combination of the following information: an algorithm type that the host uses to obtain the bit error information, and a bit error information checksum.

12. A method, performed on an optical network node containing a host and an optical module that includes an optical receiver and a digital processor, for optimizing performance of the optical receiver, and where the optical module is configured to interoperate with the host connected to the optical module via a connector of the optical module to optimize performance of the optical receiver, the method comprising:
  receiving, by the optical receiver, an optical signal from an optical network fiber;
  converting, by the optical receiver, the optical signal into a first electrical signal;
  processing, by the optical receiver, the first electrical signal according to a set control parameter in the optical receiver for performance optimization of the optical receiver, so as to obtain a second electrical signal;
  sending, via the connector of the optical module the second electrical signal to the host, so that the host obtains a bit error information according to the second electrical signal;
  receiving, by the connector of the optical module the bit error information obtained by the host; and
  adjusting, by the digital processor of the optical module according to the bit error information obtained by the host and received by the connector of the optical module the set control parameter used in the optical receiver for performance optimization of the optical receiver.

13. The method according to claim 12, wherein the received bit error information comprises one or any combination of the following information: corrected bit error information, electronic dispersion compensation (EDC) information, loss of frame (LOF) state information, and loss of optical signal (LOS) state information.

14. The method according to claim 13,
  detecting, from the bit error information, occurrence of at least one of the situations: (a) the received LOF state information indicates that loss of frame occurs, and (b) the LOS state information indicates that loss of optical signal occurs, and
  in response to the detecting, performing the adjusting, wherein the adjusting the control parameter for performance optimization comprises one of the group consisting of:
    (i) setting the control parameter for performance of the optimization to an initial value, and (ii) stopping adjusting the control parameter for performance of the optimization.

15. The method according to claim 13, wherein the adjusting, according to the bit error information, the control parameter for performance of the optimization comprises at least one of the group consisting of:
   (a) adjusting an equalization parameter according to the corrected bit error information; and
   (b) adjusting an electronic dispersion compensation EDC parameter according to the corrected bit error information.

16. The method according to claim 12, wherein the received bit error information further comprises one or any combination of the following information: an algorithm type that the host uses to obtain the bit error information, and a bit error information checksum.

17. The method according to claim 16, wherein the received bit error information comprises the bit error information checksum, and
   wherein, before the adjusting, the method further comprises determining whether the bit error information checksum is correct, and
      in response to determining the bit error information checksum is correct, adjusting, according to the bit error information, the control parameter for performance the optimization; and
      in response to determining the bit error information checksum is incorrect, stopping adjusting the control parameter for performance the optimization.

* * * * *